July 24, 1951  J. HILTON  2,562,099
SPRING ASSEMBLY
Filed May 18, 1948

Inventor
John Hilton
By
Attorney

Patented July 24, 1951

2,562,099

UNITED STATES PATENT OFFICE 2,562,099

SPRING ASSEMBLY

John Hilton, Dublin, Eire

Application May 18, 1948, Serial No. 27,627

10 Claims. (Cl. 5—351)

This invention relates to interior spring assemblies for upholstery such as mattresses, cushions, cushioned seats and cushioned backs or other portions of seats, chairs, settees, motor car and transport vehicle seats and for other like purposes and of the type in which multiple spring units are provided each comprising a plurality of conical coil springs concentrically arranged, one within the other and attached to thin flexible, or non-flexible, laths which form a lath frame, or attached to one or more lath strips, or other support, either flexible or non-flexible, the multiple spring units being outstandingly attached to said lath frame, or said strips, to provide resilient resistance at one or both sides thereof.

The object of the present invention is to provide a construction of an interior spring assembly for upholstery, the resilience of which will be graded to suit various loads which may be applied to the spring assembly, for example by persons of relatively light and heavier weights, and/or to dispose suitable spring resistance to resiliently support weights or loads which may be anticipated to vary over the whole spring assembly, or at a selected position or positions thereon, or where different weights or loads may be anticipated over a predetermined area of spring upholstery.

According to the present invention I provide improved interior spring assemblies of the type stated characterised by an assembly of conical coil springs which, at their smaller ends, are mounted outstandingly on a flexible or non-flexible lath frame, or attached to one or more lath strips, or other support, either flexible or non-flexible, the outer coils of adjoining springs being linked together, such linking connection, in the case of parallel rows of the coil springs, as, for example, in a mattress or chair seat, being preferably effected by means of spiral spring members extending across the assembly between adjoining rows of the springs and engaging and linking together all the adjoining outer coils of the springs in adjoining rows, or, alternatively, the linking together of the adjoining springs may be effected by individual wire or other suitable links, such an assembly of linked conical coil springs being combined with a corresponding number of conical coil springs of lesser diameter each concentrically arranged within a linked spring and of greater length than the linked springs so that they are outstanding therefrom and adapted in the first instance to resiliently accommodate and support a person lying, sitting or resting on the assembly, persons of light weight deflecting only said lesser diameter springs and being comfortably supported thereby whilst a heavier person will, due to increased weight, depress said smaller diameter springs to the outer coils of the linked springs so that further depression will bring the resilient support of the linked springs into use to increase the weight-bearing capacity of the whole assembly so that the heavier person will be comfortably supported thereby and will not compress the springs of the assembly beyond their effective resiliency. The linking together of the springs of the linked coils of the assembly has the further advantage of more effective distribution or spreading the load or pressure from any particular point of pressure on the assembly, i. e. from any particular unit or units of the assembly to adjacent units, thereby adding to the effective resiliency and effective support of the assembly, as, for example, when a person applies increased localised pressure on a particular part of the assembly when turning over on a mattress or sitting on a spring interior seat or settee.

The springs in a spring assembly as described may vary in gauge, for example an outer spring may be of heavier gauge than the spring immediately inside it or vice versa.

The invention will now be described, by way of example only, with reference to the accompanying drawings wherein.

Figure 1:
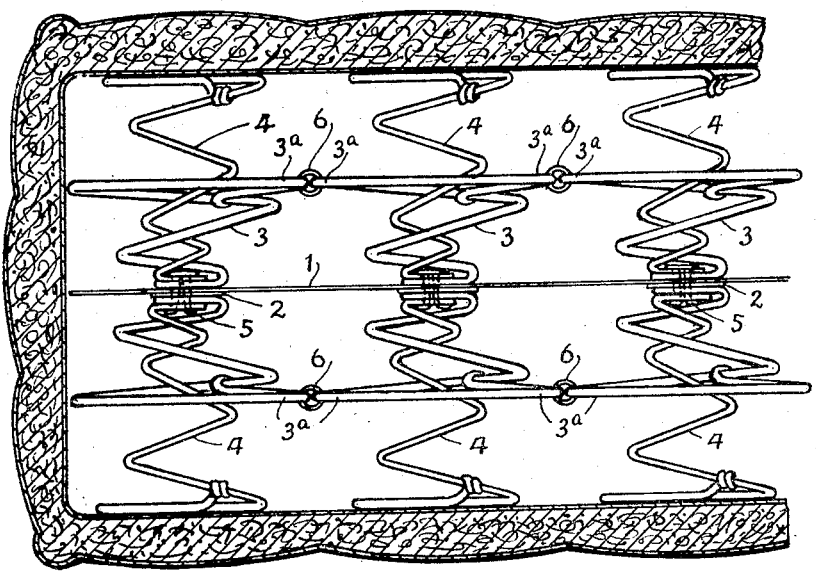
Fig. 1 shows in elevation a section or part of a mattress with interior spring assembly in accordance with the invention.

Referring to the drawings:

In the example shown in Fig. 1 the multiple spring unit assembly comprises a plurality of multiple spring units mounted on opposite sides of a flexible metal lath 1 which, with the cross laths 2, constitute a lath frame for a mattress. Each multiple spring unit, as shown, comprises an outer spring 3 and an inner spring 4, the outer spring 3 being of heavier gauge than the inner spring 4. The inner spring 4 is of greater length than the outer spring 3. Both of these conical coil springs are, at their smaller ends, attached to the spring laths 1 and 2 by means of bifurcated rivets 5.

Figure 2:
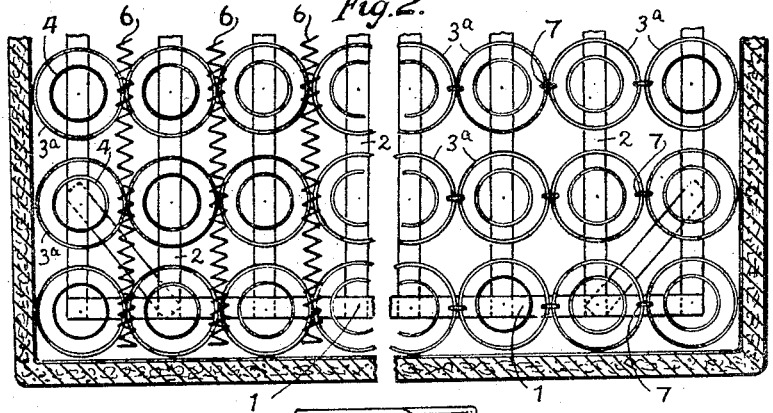
Fig. 2 is a smaller scale diagrammatic plan view of a portion of a spring assembly, for clearness only the outer coils of both outer and inner springs of each unit being shown, alternative ways of linking the outer coils of adjacent outer springs being illustrated in this view.

The outer coils 3a of the outer springs 3 are, as shown at the left-hand side of Fig. 2, linked together at their adjacent peripheries by spiral springs 6 (see also Fig. 1) which are inserted so as to engage the adjacent peripheries of all the outer coils 3 in adjoining rows of springs. These coil linking spiral springs may extend either transversely across a mattress, or chair seat, or other spring upholstered article, or they may run longitudinally where the article, such as a mattress has greater length than width. Alternatively any two of the adjoining outer coils 3a of the outer springs 3 may, as shown at the right hand side of Fig. 2, be linked together by individual wire links 7 or other suitable linking means.

Figure 3:
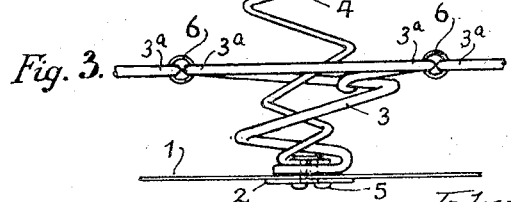
Fig. 3 shows a multiple spring unit of an assembly in accordance with the invention as applied to one side only of a lath as distinct from Fig. 1 which shows the multiple spring units applied to opposite sides of a lath.

At Fig. 3 I have shown the improved multiple spring unit of an assembly in accordance with the invention applied to one side only of a lath 1. Such an arrangement would, for example, be suitable for use in a spring assembly for a non-reversible spring mattress, or for the seat and/or back of a chair or other like spring upholstered furniture or for the seat and/or back of a motor car or motor vehicle seat. The arrangement shown at Fig. 1 having the spring units on both sides of a lath frame would, for example, be suitable for use for the interior spring assembly of a reversible spring mattress, or for the interior spring assembly for a seat or cushion. In the case of a mattress it may not be necessary to provide the multiple spring units throughout the whole of the spring assembly but only where greater weight and/or use is anticipated. In such cases, single spring units of known construction may be used where additional resiliency of the multiple spring units is not required. Mattresses, seats, cushions and spring upholstery generally having the improved spring assembly applied thereto will give greater comfort in use than where only the usual single coil springs are provided. The improved multiple spring assembly will give the required resiliency for persons of different weights. For example, a light person lying on a mattress, or sitting on a seat, having these improved multiple spring units may deflect only the inner springs of the assembly units and be comfortably supported thereby whilst a heavier person will, due to increased weight, depress the inner springs to and beyond the outer coils of the outer springs thereby bringing the resilient support of the outer springs into use to increase the weight-bearing capacity of the assembly so that the heavier person will be comfortably supported thereby and will not compress the springs beyond their effective resiliency. The linking together of the outer coils of adjacent outer springs of multiple spring units, of the assembly as hereinbefore described, has the further advantage of spreading the load or pressure on any particular unit or units to adjacent units thereby adding to the effective resiliency and support of the assembly.

While the improved multiple spring unit assembly may be applied to a spring lath frame as, for example, a frame constructed of a number of spring laths suitably secured together to form a frame, it is to be understood that the improved multiple spring assembly can be attached to a rigid or non-flexible strip or frame or other support where the additional resiliency provided by the spring laths is not considered necessary, as, for example, in the back and/or sides of a spring upholstered chair or seat.

The inner and/or outer coils of the multiple spring units of an assembly, as described, may, if desired, be covered with plastic or textile, or equivalent material to render movement of the springs as silent as possible.

What I claim is:

1. A spring assembly for upholstery which comprises a plurality of spring units spaced throughout the area to be upholstered between a weight-bearing surface and support means, each of said units comprising a plurality of coil springs concentrically arranged one within the other, means attaching one end of all of the springs to the support means, the outer spring of each unit being shorter than the inner spring so that said outer spring only comes into action when the inner spring has been partially compressed, and means linking the juxtaposed outer coils of adjacent outer springs together.

2. A spring unit for use between a weight-bearing surface and support means in spring upholstery, said unit comprising a plurality of coil springs of different diameters and lengths arranged one within the other, means connecting the springs to the support means so that all the springs at one end bear on the support means while the other end of the outer spring falls short of the other end of the inner spring and means linking the juxtaposed outer coils of adjacent outer springs.

3. A spring assembly for upholstery which comprises a plurality of spring units spaced from each other between a weight-bearing surface and support means, each unit comprising a plurality of conical coil springs concentrically arranged, means attaching the narrower ends of the springs to the support means, the inner spring of each unit being of lesser diameter but of greater length than the outer spring so that the outer spring does not come into supporting action until the inner spring is partially compressed and means linking the juxtaposed outer coils of adjacent outer springs.

4. A spring unit for use between the weight-bearing surface and the support means of upholstery, said unit comprising a plurality of conical coil springs of decreasing diameters arranged concentrically one within the other, means connecting the narrower ends of the springs so that all these ends bear on the support means, the wider end of the outer spring falling short of the wider end of the inner spring so that the outer spring only comes into action after partial compression of the inner spring, and means linking the juxtaposed outer coils of adjacent outer springs.

5. A spring assembly for upholstery which comprises a plurality of spring units spaced from each other between a weight-receiving surface and a support surface, each unit comprising a plurality of conical coil springs of decreasing diameter concentrically arranged one within the other, the outer spring being of lesser length than the inner spring, a common rivet connecting the narrower ends of the springs to a lath forming part of the support surface and means linking together the juxtaposed outer coils of adjacent outer springs.

6. A spring upholstered article comprising a weight-receiving surface, a support surface formed by a plurality of laths and a plurality of spring units spaced from each other and extending between said surfaces, each unit comprising an outer conical coil spring and an inner conical coil spring the outer conical coil spring being of larger diameter but of lesser length than the inner coil spring, the springs being concentrically arranged one within the other, a common member attaching the narrower ends of both springs to a lath with the outer end of the inner spring contacting the weight-supporting surface and the outer end of the outer spring being spaced from said weight-supporting surface and means linking together the juxtaposed outer coils of adjacent outer springs.

7. A spring assembly for upholstery which comprises a plurality of spring units spaced from each other and arranged in rows between a weight-bearing surface and support means, each unit comprising a plurality of conical coil springs concentrically arranged, means attaching the narrower ends of the springs to the support means, the inner spring of each unit being of lesser diameter but of greater length than the outer spring so that the outer spring does not come into supporting action until the inner spring has been partially compressed and spiral spring members engaging and linking together the juxtaposed outer coils of outer springs in adjacent rows of the spaced spring units.

8. A spring assembly for upholstery which comprises a plurality of spring units spaced from each other and arranged in rows between a weight-bearing surface and support means, each unit comprising a plurality of conical coil springs concentrically arranged, means attaching the narrower ends of the springs to the support means, the inner springs of each unit being of lesser diameter but of greater length than the outer spring so that the outer spring does not come into supporting action until the inner spring has been partially compressed, juxtaposed outer coils of adjacent outermost springs in adjacent rows being linked together by individual link members.

9. A spring-upholstered mattress comprising two outer flexible weight-receiving surfaces, an intermediate support surface including laths and a plurality of spring units spaced from each other and extending between either side of the support surface and the corresponding flexible weight-receiving surface, each unit comprising an outer conical coil spring and an inner conical coil spring of lesser diameter but of greater length than the outer spring, the inner spring being concentrically arranged in relation to the outer spring, a common member attaching the narrower ends of the outer and inner springs to the laths with the outer ends of the inner springs contacting the weight-bearing surfaces, the outer end of the outer spring being spaced from said weight-bearing surface and means linking together the juxtaposed outer coils of adjacent outer springs.

10. A mattress as claimed in claim 9, comprising single coil spring units in combination with the multi-spring units as claimed in the preceding claims.

JOHN HILTON.

REFERENCES CITED

The following references are of record in the file of this patent:

UNITED STATES PATENTS

| Number | Name | Date |
|---|---|---|
| 837,751 | Summers | Dec. 4, 1906 |
| 2,480,158 | Owens | Aug. 30, 1949 |